United States Patent

Bekkering et al.

[11] Patent Number: 5,572,867
[45] Date of Patent: Nov. 12, 1996

[54] EXHAUST AIR RAIL MANIFOLD

[75] Inventors: Mark W. Bekkering, Byron Center; Ernest C. Thomas, Kent City; Earl W. Mattson, Cedar Springs, all of Mich.

[73] Assignee: Benteler Industries, Inc., Grand Rapids, Mich.

[21] Appl. No.: 366,465

[22] Filed: Dec. 30, 1994

Related U.S. Application Data

[63] Continuation-in-part of Ser. No. 151,556, Nov. 12, 1993, Pat. No. 5,349,817.

[51] Int. Cl.⁶ .................................................. F01N 3/30
[52] U.S. Cl. ................................................. 60/305
[58] Field of Search ................................. 60/304, 305

[56] References Cited

U.S. PATENT DOCUMENTS

| | | | |
|---|---|---|---|
| 1,897,746 | 2/1933 | Winslow | 60/305 |
| 3,444,687 | 5/1969 | Andersson | 60/305 |
| 3,468,124 | 9/1969 | Hraboweckyj | 60/305 |
| 3,522,702 | 8/1970 | Grosseau | 60/305 |
| 3,635,031 | 1/1972 | Haddad | 60/305 |
| 3,722,221 | 3/1973 | Chopin | 60/282 |
| 3,965,678 | 6/1976 | Shiki | 60/305 |
| 4,372,112 | 2/1983 | Ackerman | 60/305 |
| 4,630,439 | 12/1986 | Hudson | 60/305 |

FOREIGN PATENT DOCUMENTS

| | | | |
|---|---|---|---|
| 2259548 | 8/1973 | Germany | 60/305 |
| 8914153 | 3/1990 | Germany . | |

*Primary Examiner*—Douglas Hart
*Attorney, Agent, or Firm*—Price, Heneveld, Cooper, DeWitt & Litton

[57] ABSTRACT

A dual wall, air gap exhaust manifold with an integral inlet connecting flange defining an elongated, internal, air injection passageway enclosed by an L-shaped plate welded over an elongated slot in the flange to form the elongated passageway, the L-shaped plate also being welded over a series of short channels which extend between the elongated passageway and the manifold inlet openings. The elongated passageway has an air inlet connector. The spaced dual walls of the manifold runners are joined together at the flange openings, just downstream of the channels.

10 Claims, 4 Drawing Sheets

EXHAUST AIR RAIL MANIFOLD

RELATED APPLICATION

This application is a continuation-in-part application of application Ser. No. 151,556 filed Nov. 12, 1993, and entitled AIR GAP MANIFOLD PORT FLANGE CONNECTION now U.S. Pat. No. 5,349,817 issued Sep. 27, 1994.

BACKGROUND OF THE INVENTION

This invention relates to exhaust gas manifolds for internal combustion engines, and particularly to a specialized dual wall exhaust manifold enabling rapid temperature rise of the catalytic converter by removing minimal thermal energy from the flow of hot combustion gases from the engine, but also by exothermic combustion in the manifold itself resulting from a special, relatively simple construction.

The technology of internal combustion engines has for some years included knowledge that post engine combustion in the exhaust manifold of remaining combustible components in the exhaust gases reduces pollution from the ultimate exhaust gas discharge. Unfortunately, special manifold arrangements for accomplishing this have been technologically complex and expensive, usually involving a "nest" of hoses and/or tubes to the system, a complex louver system, or otherwise. The complexity not only involves an initial high cost, but also maintenance problems and expenses over the lifetime of the engine.

SUMMARY OF THE INVENTION

Ultimately, the invention herein was developed having a dual wall, air gap exhaust manifold with an integral inlet connecting flange defining an elongated internal passageway enclosed preferably by an L-shaped plate welded over an elongated slot in the flange to form the elongated passageway, the L-shaped plate also being welded over a series of short channels which extend between the elongated passageway and the manifold inlet openings. The elongated passageway has an air inlet connector. The spaced dual walls of the manifold runners are joined together at the flange openings, just downstream of the channels. The dual walls of the intake manifold body or log also join together at the outlet port.

The novel structure provides a relatively simple manifold capable of mass production, effective in operation, and free of a series of extraneous tubes and hoses. The novel dual wall structure with the air inlets is capable of minimum heat sink for the inner liner, for optimum heat up and combustion of residual combustible gases, and rapid heating of a downstream catalytic converter.

These and several other features, objects and advantages of the invention will become apparent to those in the art upon studying the following specification in conjunction with the drawings.

DESCRIPTION OF THE PREFERRED EMBODIMENT

Figure 1:
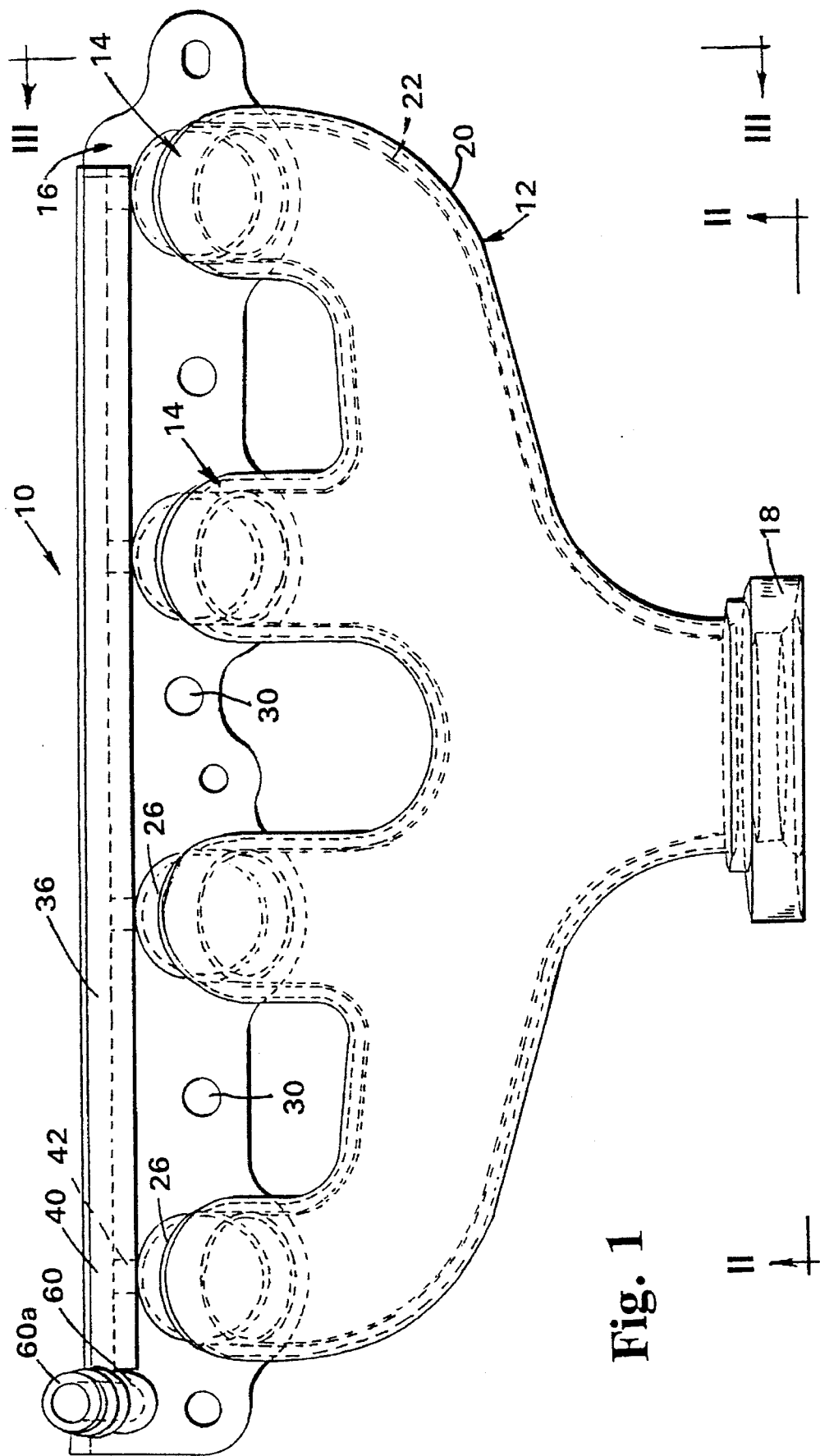
FIG. 1 is an elevational view of a vehicle engine exhaust manifold of this invention.

The manifold assembly 10 comprises a main body 12 from which extend a plurality of spaced runners 14, an inlet connecting flange 16 for attachment of the manifold to an engine block, and an outlet or exhaust flange 18.

The body or, as it is commonly called, "log" 12 of the manifold is an elongated member in flow communication with each of the several runners, here shown to be four in number. The illustrated manifold can, for example, be for one bank of cylinders of a V-8 engine, there being a mirror image duplicate of this manifold on the opposite side of the engine.

Figure 2:
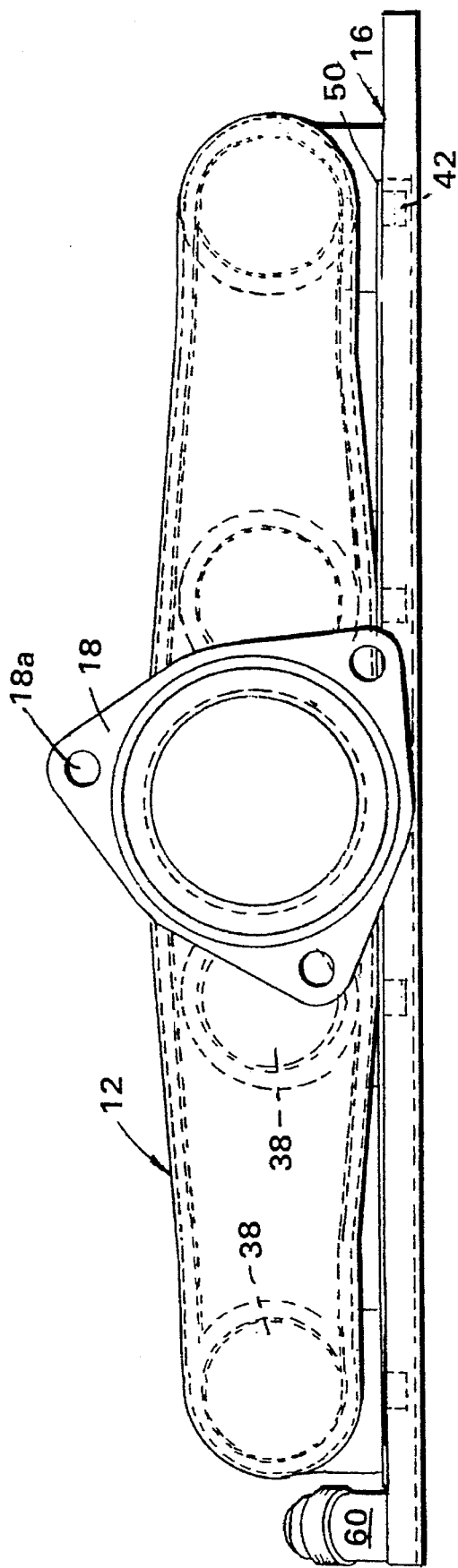
FIG. 2 is a view of the manifold in FIG. 1, from the direction II—II, i.e., toward the exhaust outlet of the manifold.
Figure 4:
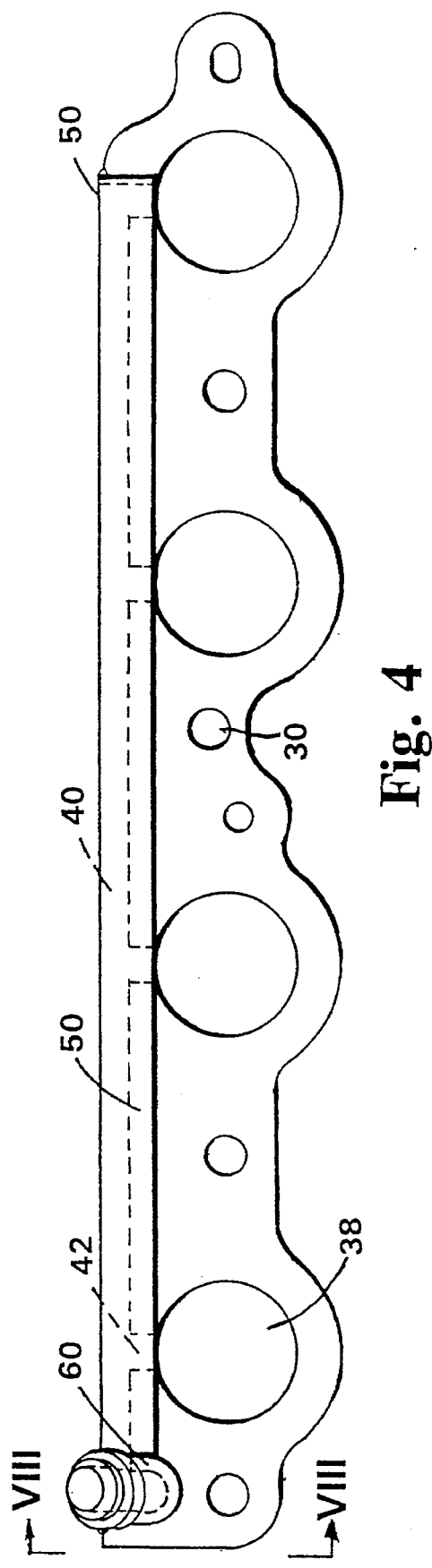
FIG. 4 is a fragmentary elevational view of the port flange in the manifold of FIGS. 1–3.
Figure 8:
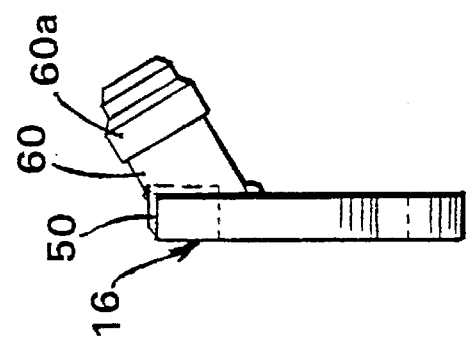
FIG. 8 is an end elevational view taken in the direction VIII—VIII of FIG. 4.
Figure 3:
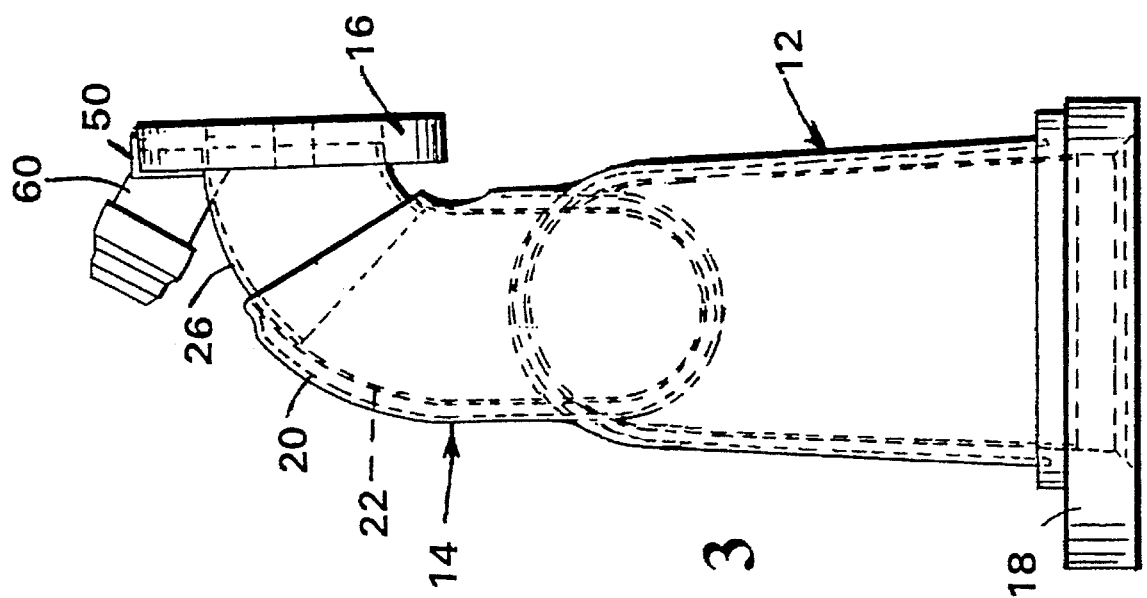
FIG. 3 is an end elevational view of the manifold in FIG. 1 taken from direction III—III.
Figure 5:
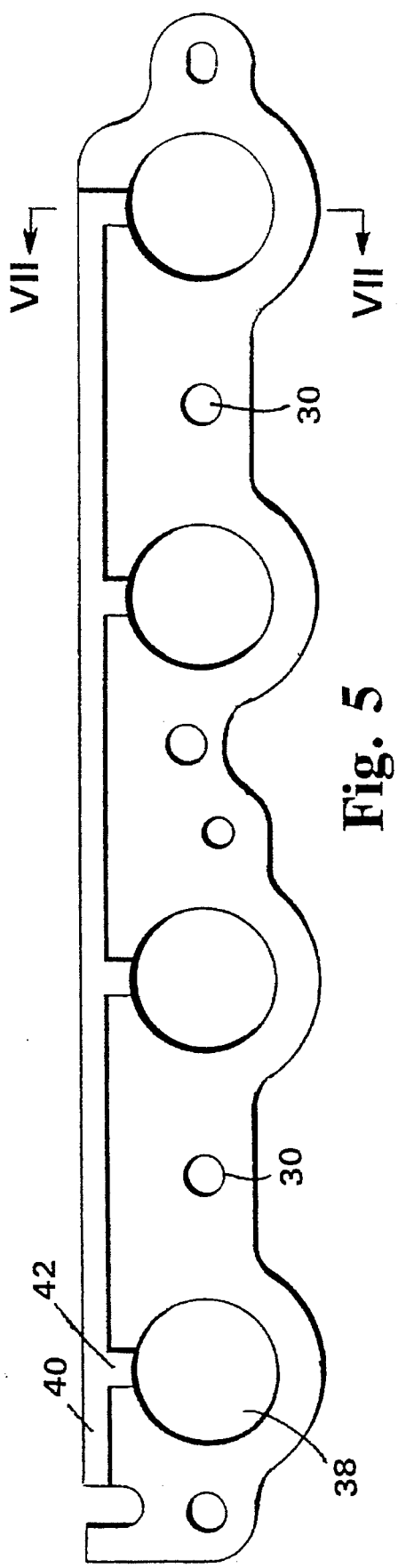
FIG. 5 is a fragmentary elevational view of the flange in FIG. 4, prior to attachment of the L-shaped cover plate.
Figure 6:
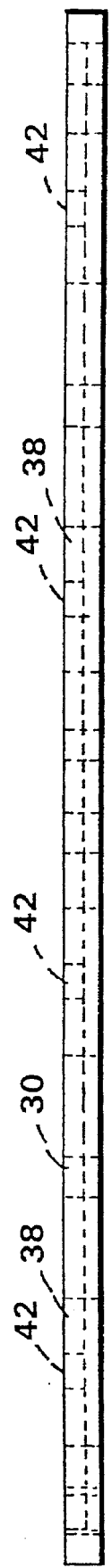
FIG. 6 is a bottom view of the flange in FIG. 5.

The log 12 includes an outer jacket 20 and an inner liner 22. The jacket and liner are spaced from each other preferably a controlled amount of several millimeters in width to form a dead air space serving as a heat insulator between the jacket and liner. The liner will typically be of less thickness than the jacket, both preferably being of stainless steel or other corrosion resistant material. Integrally extending from log 12 are the plurality of runners which continue the double wall construction, and are to receive exhaust gases from respective ones of the several engine cylinders. Connecting the individual runners to the inlet flange assembly 16 are individual sleeves 26 (FIGS. 1 and 3). The outer end of each sleeve 26 is welded to the two engaging walls of jacket 20 and liner 22, while the inlet end of each sleeve 26 is welded to the peripheral wall of a corresponding through opening of connector plate 16. This sleeve arrangement is preferably made in accordance with the teachings in pending patent application Ser. No. 151,556, filed May 14, 1993, and entitled AIR GAP MANIFOLD PORT FLANGE CONNECTION, referred to above and incorporated by reference herein. As noted, jacket 20 and liner 22 are engaged with each other circumferentially where they are joined to sleeve 26. Likewise, the jacket and liner are engaged with each other where they join discharge flange 18. This flange 18 has suitable orifices 18a such as the three depicted in FIG. 2, for attachment to an exhaust pipe of conventional or air-gap type.

Figure 7:
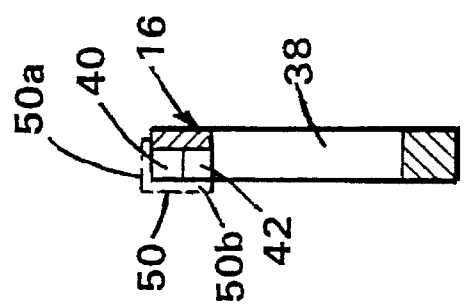
FIG. 7 is a sectional view taken on plane VII—VII of FIG. 5.

Inlet flange 16 is an elongated component of substantial thickness, having a plurality of bolt-receiving openings 30 (FIG. 1) at spaced intervals along its length for attachment to the engine. Shown along its upper edge is the special air injection structure to enable ambient air to be injected for oxidation purposes into the exhaust gases as they flow from the engine to the exhaust manifold assembly. More specifically, an elongated passageway 36 extends along the length of flange 16 to be adjacent to and overlap all of the plurality of exhaust gas inlet openings 38 (FIG. 2). This passageway is formed by an elongated slot or channel 40 (FIG. 7) formed into the upper outer corner of flange 16 as by machining, casting or stamping, and terminating short of the opposite ends of the flange. A plurality of short channels 42 (FIG. 7) normal to channel 40, extend between elongated channel 40 and each of openings 38 so as to allow flow communication therebetween. Coveting both elongated channel 40 and the plurality of short channels 42 is an elongated, L-shaped cover plate 50. The upper horizontal leg 50a of cover plate 50 extends over the top of channel 40 and is welded to the upper surface of connector plate 16. The vertical leg 50b of cover plate 50, which is normal to 50a, extends over the side of channel 40 as well as over short channels 42, and is welded to the side face of connector plate 16 as well as to the adjacent area of sleeves 26, thereby enclosing channels 40 and 42 from the ambient atmosphere. An air inlet conduit 60 having a threaded outer end 60a is welded to plate 16 at one end of passageway 36, so that oxygen-bearing air can be injected into passageway 36 and thus into the hot exhaust gases flowing through ports 38 into the exhaust manifold, where further combustion occurs, including conversion of carbon monoxide to carbon dioxide with the added oxygen, due to the maintained high temperature of the exhaust gas and the presence of the additional oxidizing gas, i.e., air. The combined heat of the exhaust gases flowing from the engine and the further combustion occurring in the exhaust manifold during start-up causes the inner liner 22 to rapidly heat to an elevated temperature while the outer jacket is thermally insulated by the air gap. The apparatus has been found very effective, simple to fabricate, relatively inexpensive, and highly effective to oxidize the noxious gases such as carbon monoxide and oxides of nitrogen and sulfur emitted from the engine.

It is conceivable that certain minor variations may be made in the illustrated structure which is the preferred embodiment set forth as exemplary of the invention. Therefore, the invention is not intended to be limited to this specific embodiment, but only by the scope of the appended claims and the reasonably equivalent structures to those defined therein.

The embodiments of the invention in which an exclusive property or privilege is claimed are defined as follows:

1. An engine exhaust manifold comprising:
   a manifold log and a plurality of runners extending from said manifold log, each runner having an exhaust gas inlet opening for conducting exhaust gases from an engine to said manifold log;
   said manifold log having an exhaust gas outlet;
   an elongated inlet connecting flange extending over said runners at said runner openings, and having an elongated corner;
   an elongated cover wall over said elongated corner and welded to said inlet connecting flange along its length to enclose an elongated passageway;
   said elongated passageway extending adjacent all of said runners; and
   a connector on said flange in flow-communication with said elongated passageway, and connecting channels between said passageway and said exhaust gas inlet openings, whereby combustion air can be injected through said connector, said passageway and said connecting channels to said runners and manifold for chemical conversion of residual combustible components remaining in engine exhaust gases.

2. An engine exhaust manifold comprising:
   a manifold log and a plurality of runners extending from said manifold log, each runner having an exhaust gas inlet opening for conducting exhaust gases from an engine to said manifold log;
   said manifold log having an exhaust gas outlet;
   an elongated inlet connecting flange extending over said runners at said runner openings;
   said elongated inlet connecting flange having an elongated passageway extending adjacent all of said runners, a connector on said flange in flow-communication with said elongated passageway, and connecting channels between said passageway and said exhaust gas inlet openings, whereby combustion air can be injected through said connector, said passageway and said connecting channels to said runners and manifold for chemical conversion of residual combustible components remaining in engine exhaust gases; and
   an elongated cover wall welded to said inlet connecting flange along its length to enclose said elongated passageway.

3. The vehicle engine exhaust manifold in claim 2 wherein said inlet connecting flange has an elongated corner containing said channel, and said elongated cover wall is L-shaped and fitted and welded over said elongated corner to enclose said passageway.

4. The vehicle engine exhaust manifold in claim 3 wherein said elongated L-shaped cover wall covers said elongated channel and said connecting channels to enclose all of said channels.

5. A vehicle engine exhaust manifold comprising:
   a manifold log and a plurality of runners extending from said manifold log, each runner having an exhaust gas inlet opening;
   an elongated, inlet connecting flange extending over said runners at said openings and having mounting orifices for attachment of said manifold to an internal combustion engine;
   said elongated, inlet connecting flange having an elongated channel; extending adjacent said runners, and having a plurality of short channels extending from said elongated channel to said inlet openings;
   an elongated cover welded to said inlet connecting flange over said elongated channel and over said short channels to form an elongated passageway extending along all of said runners, and form short connecting channels between said passageway and said runners;
   a connector on said inlet connecting flange and in flow-communication with said elongated passageway, whereby combustion air can be injected through said connector, said passageway and said connecting channels to said runners of said manifold for chemical reaction of residual combustible components in engine exhaust gas.

6. The vehicle engine exhaust manifold in claim 5 wherein said inlet connecting flange has an elongated corner containing said elongated channel, and said elongated cover wall is L-shaped and fitted and welded over said elongated corner to enclose said elongated passageway and said short connecting channels.

7. The vehicle engine exhaust manifold in claim 1 wherein said log and said runners have an outer jacket and an inner liner generally spaced from each other to create an air gap therebetween, said jacket and liner being joined together adjacent said inlet connecting flange and adjacent said exhaust gas outlet, whereby said inner liner can be heated rapidly by exhaust gases entering said runners and by said combustion in said manifold.

8. A vehicle engine exhaust manifold comprising:
   a manifold log and a plurality of runners extending from said manifold log, each runner having an exhaust gas inlet opening and said manifold log having an exhaust gas outlet;
   an elongated, inlet connecting flange extending over said runners at said inlet openings and having mounting orifices for attachment of said manifold to an internal combustion engine;

said log and said runners having an outer jacket and an inner liner generally spaced from each other to create an air gap therebetween, said jacket and liner being joined together adjacent said inlet connecting flange and adjacent said exhaust gas outlet, whereby said inner liner will remove minimal thermal energy from exhaust gases entering said runners;

said elongated, inlet connecting flange having an elongated channel extending adjacent said runners, and having a plurality of short channels extending from said elongated channel to said inlet openings;

an elongated cover welded to said inlet connecting flange over said elongated channel and over said short channels to form an elongated passageway extending between all of said runners, and form short connecting channels between said passageway and said exhaust gas inlet openings; and a connector on said inlet connecting flange and in flow-communication with said elongated passageway, whereby combustion air can be pumped through said connector, said passageway and said connecting channels to said gas inlet openings of said manifold for chemical conversion of residual combustible components in engine exhaust gas.

9. The vehicle engine exhaust manifold in claim 8 wherein said inlet connecting flange has an elongated corner containing said elongated channel, and said elongated cover wall is L-shaped and fitted and welded over said elongated corner to enclose said elongated passageway and said short connecting channels.

10. The vehicle engine exhaust manifold in claim 8 wherein said inlet connecting flange has an elongated corner containing said channel, and said elongated cover wall is L-shaped and fitted and welded over said elongated corner to enclose said passageway.

\* \* \* \* \*